Figure 1:
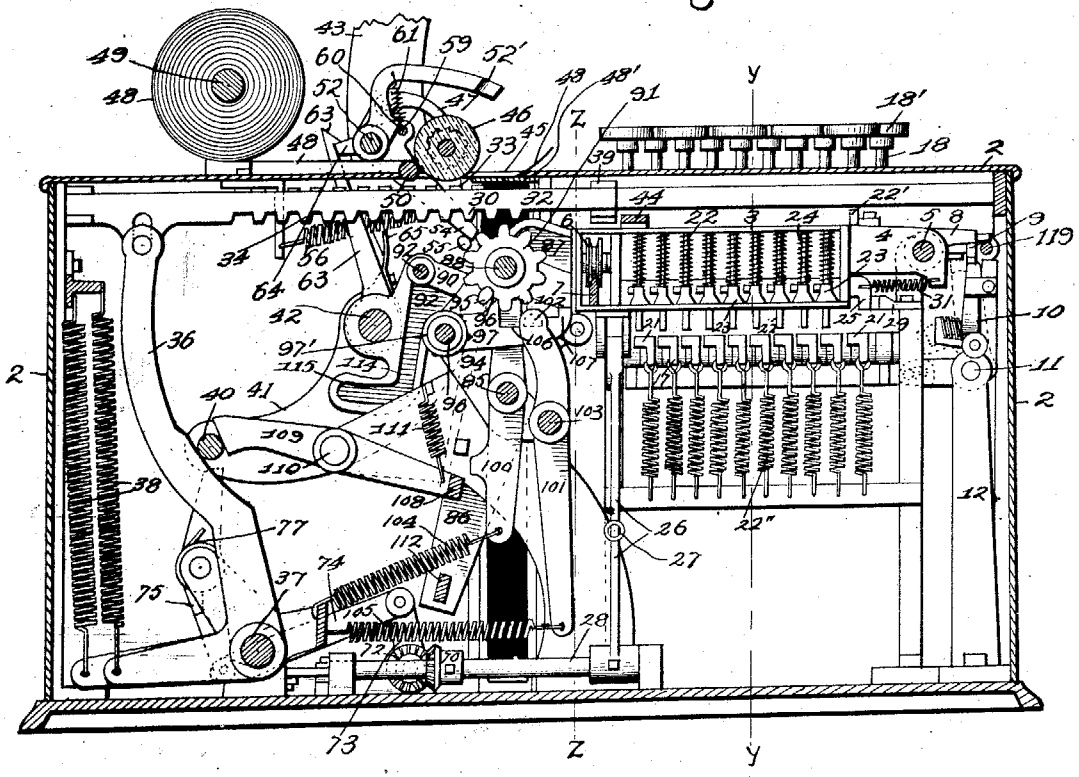

No. 12,296. REISSUED DEC. 27, 1904.

H. H. HELMICK.

COMPUTING MACHINE.

APPLICATION FILED OCT. 9, 1903.

9 SHEETS—SHEET 1.

Witnesses
Mercer Arnold.
William R. Scudder

Inventor
H. H. Helmick
by J. D. Rippey Atty.

No. 12,296. REISSUED DEC. 27, 1904.

H. H. HELMICK.

COMPUTING MACHINE.

APPLICATION FILED OCT. 9, 1903

9 SHEETS—SHEET

Witnesses
Mercer Arnold
William K. Scudder

Inventor
H. H. Helmick
by J. D. Rippey, atty.

No. 12,296

REISSUED DEC. 27, 1904.

H. H. HELMICK.

COMPUTING MACHINE.

APPLICATION FILED OCT. 9, 1903.

9 SHEETS—SHEET 3.

Witnesses
Mercer Arnold.
William R. Scudder

Inventor
H. H. Helmick
by J. D. Rippey atty.

No. 12,296. REISSUED DEC. 27, 1904.

H. H. HELMICK.

COMPUTING MACHINE.

APPLICATION FILED OCT. 9, 1903.

9 SHEETS—SHEET 4.

Witnesses
Mercer Arnold
William R. Scudder

Inventor
H. H. Helmick.
by J. D. Kippey atty.

No. 12,296. REISSUED DEC. 27, 1904.

H. H. HELMICK.

COMPUTING MACHINE.

APPLICATION FILED OCT. 9, 1903.

9 SHEETS—SHEET 5.

Witnesses
Mercer Arnold.
William R. Scudder

Inventor
H. H. Helmick.
by J. D. Rippey Atty.

No. 12,296. REISSUED DEC. 27, 1904.

H. H. HELMICK.

COMPUTING MACHINE.

APPLICATION FILED OCT. 9, 1903.

9 SHEETS—SHEET 6.

Witnesses
Mercer Arnold.
William R. Scudder

Inventor
H. H. Helmick
by J. D. Rippey Atty.

No. 12,296.

REISSUED DEC. 27, 1904

H. H. HELMICK.

COMPUTING MACHINE.

APPLICATION FILED OCT. 9, 1903.

9 SHEETS—SHEET 7.

Witnesses
Mercer Arnold.
William R. Scudder

Inventor
H. H. Helmick
by J. D. Rippey atty

No. 12,296 REISSUED DEC. 27, 1904.

H. H. HELMICK.

COMPUTING MACHINE.

APPLICATION FILED OCT. 9, 1903.

9 SHEETS—SHEET 8.

Witnesses

Mercer Arnold

William R. Scudder

Inventor

H. H. Helmick by J. D. Rippey atty.

No. 12,296. REISSUED DEC. 27, 1904.

H. H. HELMICK.

COMPUTING MACHINE.

APPLICATION FILED OCT. 9, 1903.

9 SHEETS—SHEET 9.

Witnesses
Mercer Arnold
William R. Scudder

Inventor
H. H. Helmick
by J. D. Rippey Att'y.

No. 12,296. Reissued December 27, 1904

UNITED STATES PATENT OFFICE.

HARRY H. HELMICK, OF CHICAGO, ILLINOIS.

COMPUTING-MACHINE.

SPECIFICATION forming part of Reissued Letters Patent No. 12,296, dated December 27, 1904.

Original No. 630,053, dated August 1, 1899. Application for reissue filed October 9, 1903. Serial No. 176,400½.

*To all whom it may concern:*

Be it known that I, HARRY H. HELMICK, a citizen of the United States, residing at Chicago, Cook county, Illinois, have invented new and useful Improvements in Computing-Machines, of which the following is a specification.

My invention relates to computing-machines, and in particular to that class of computing-machines in which the figures and totals are printed upon a slip or strip of paper.

One object of my invention is to provide a computing-machine which shall be of a simple and strong construction, which cannot readily get out of order, and, further, to provide a device of this class which shall be neat and compact and occupy but a small space upon a desk.

Another object is to provide a computing-machine having a series of type-carriers to be moved to present the required figures at the printing-line, in combination with a frame carrying stops, said frame and stops being movable to limit the movement of the type-carriers as required when numbers are registered.

Another object is to provide a computing-machine having a carriage and stops therein and keys controlling the carriage and stops and a number of type-carriers movably mounted in the machine and devices for moving the carriage and type-carriers relatively, so that the stops which had been acted upon by the keys will limit the throw of the type-carriers, and thereby cause the number which has been struck on the keys to be registered or presented at a given line representing the printing-line.

A further and more particular object is to provide a computing-machine which shall operate in an extremely easy manner, few movements of the hands being required.

A still further object is to provide a machine wherein the strip of paper and the numbers thereon are easily rendered visible, and, further, to provide a machine which will permit of a very rapid operation and will produce accurate and clear work even when the keys are manipulated at a high speed.

To these ends my invention consists generally in a computing-machine of the construction and combination of parts, all as hereinafter described, and particularly pointed out in the claims.

My invention will be more readily understood by reference to the accompanying drawings, in which—

Figure 2:
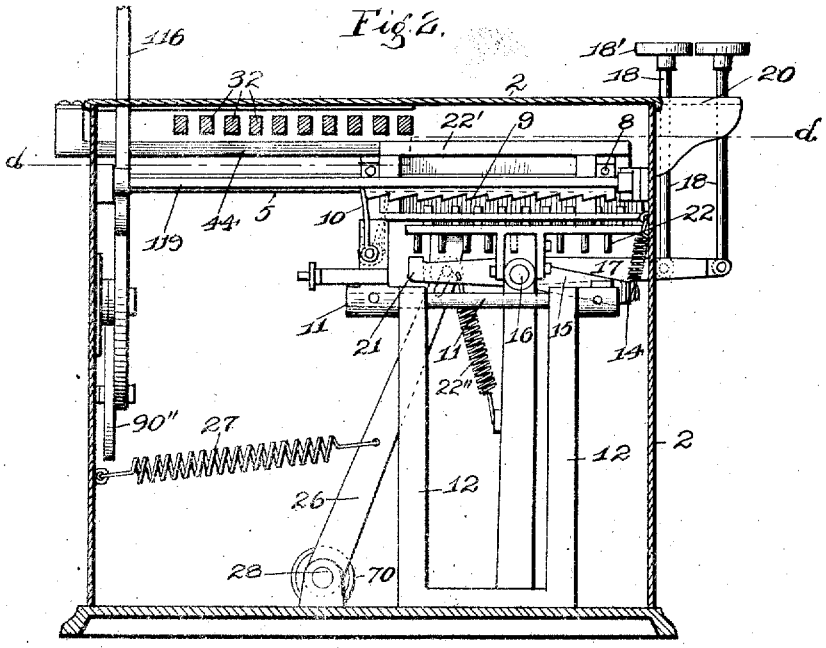
Figure 3:
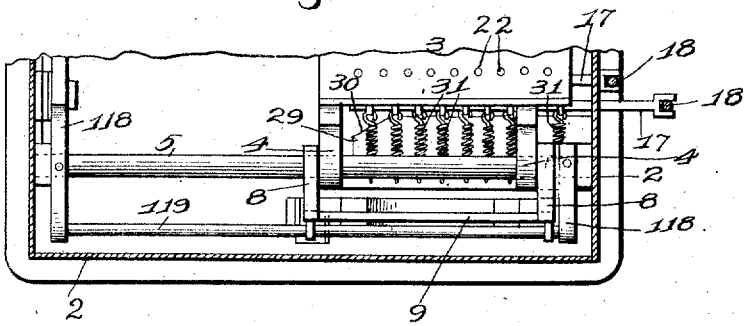
Figure 4:
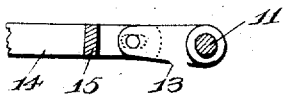
Figure 5:
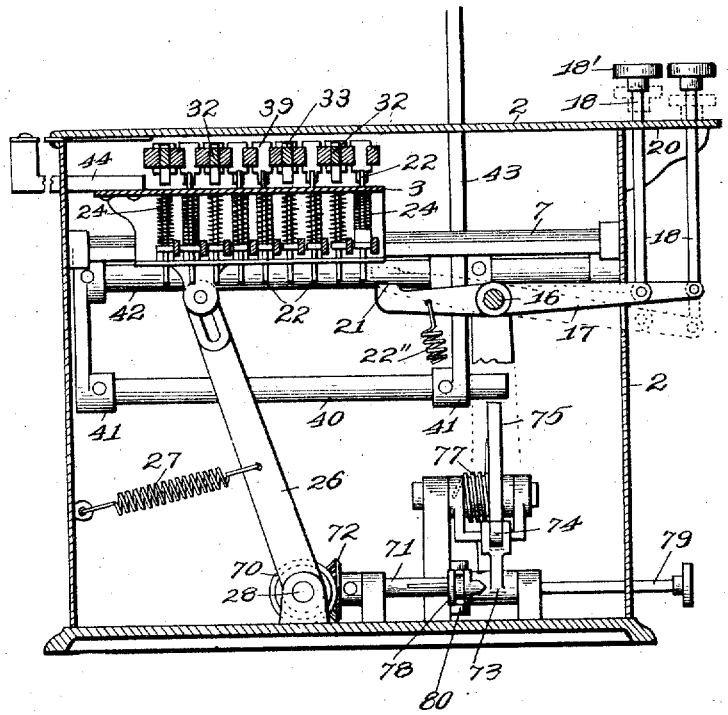
Figure 6:
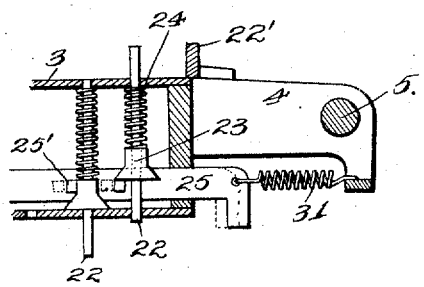
Figure 7:
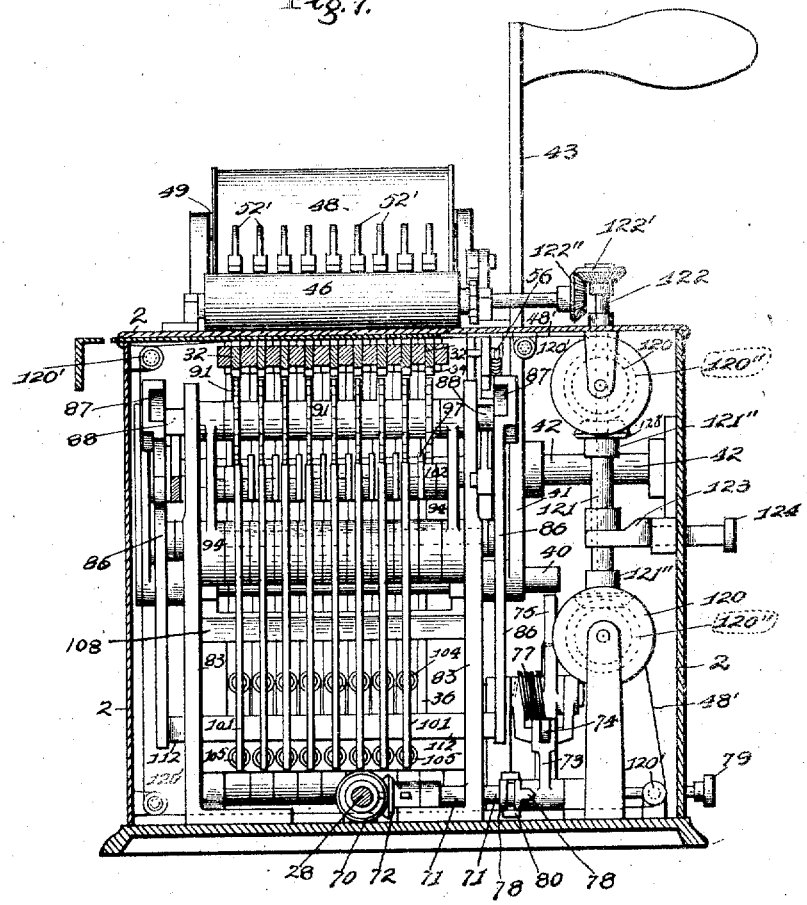
Figure 8:
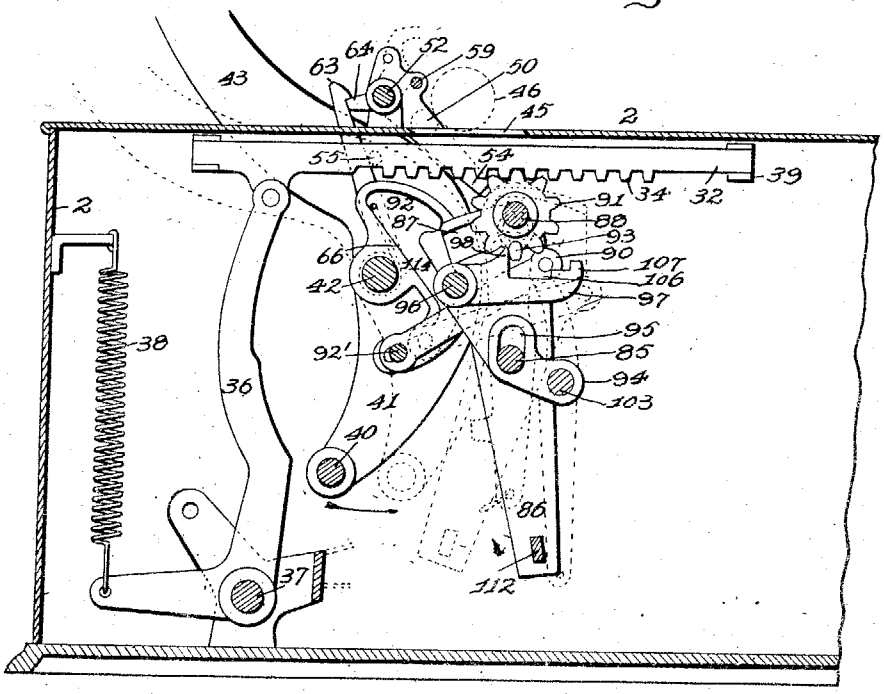
Figure 12:
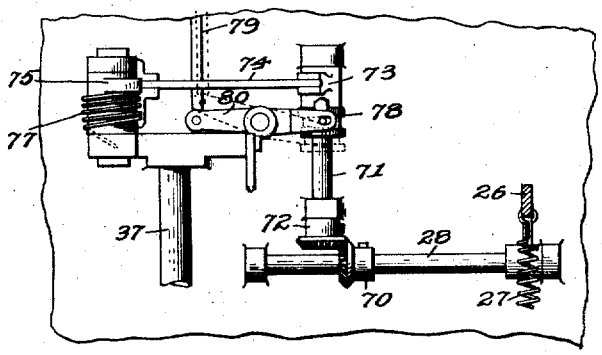
Figure 9:
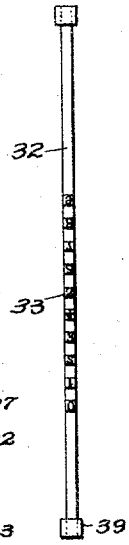
Figure 11:
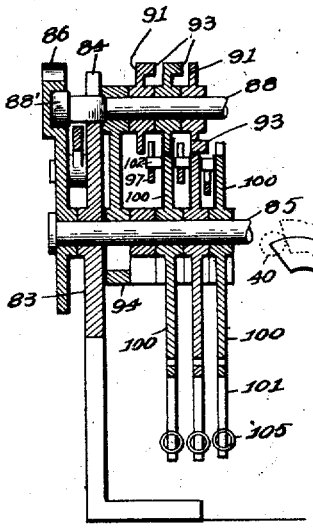
Figure 10:
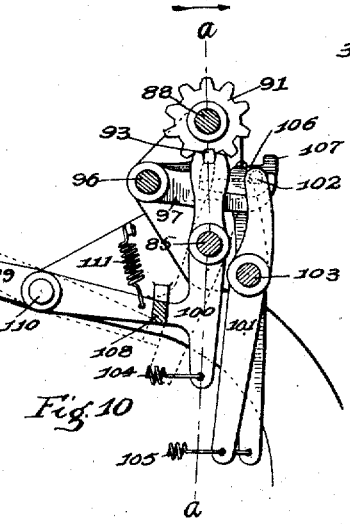
Figure 13:
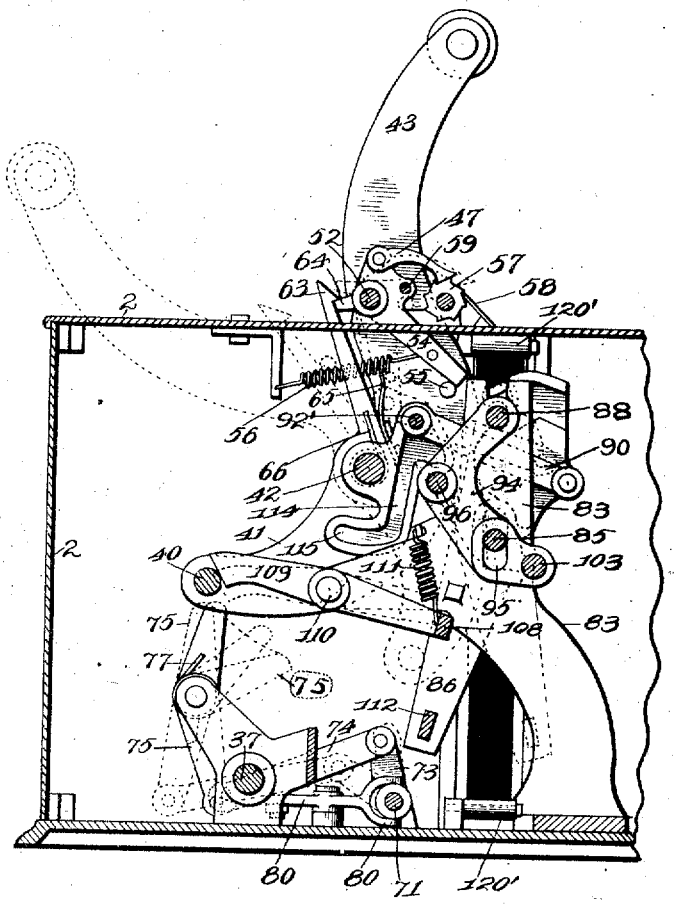
Figure 14:
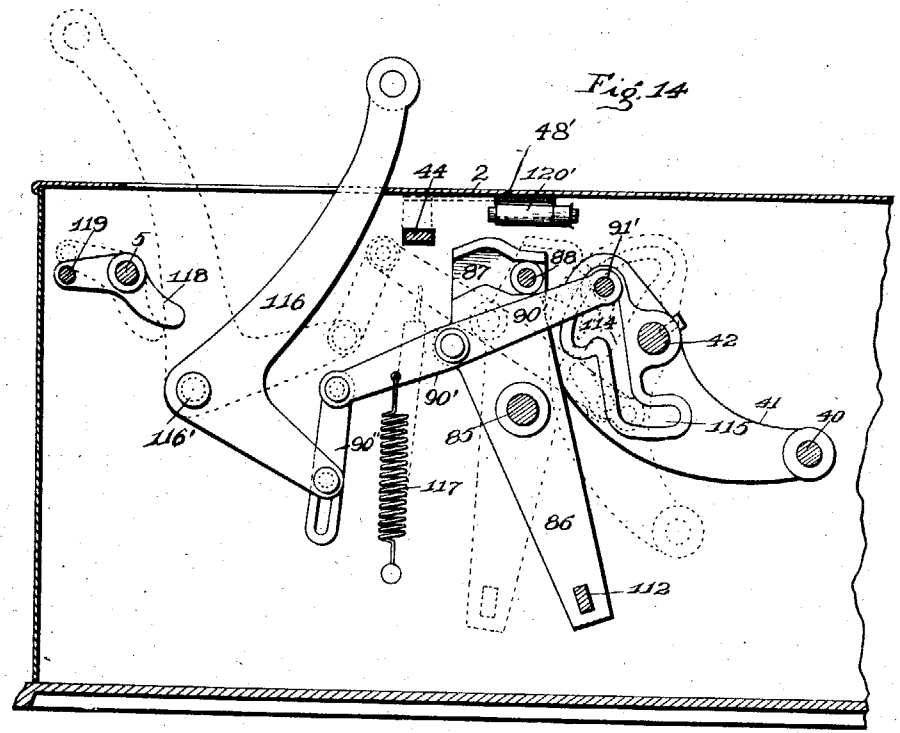
Figure 15:
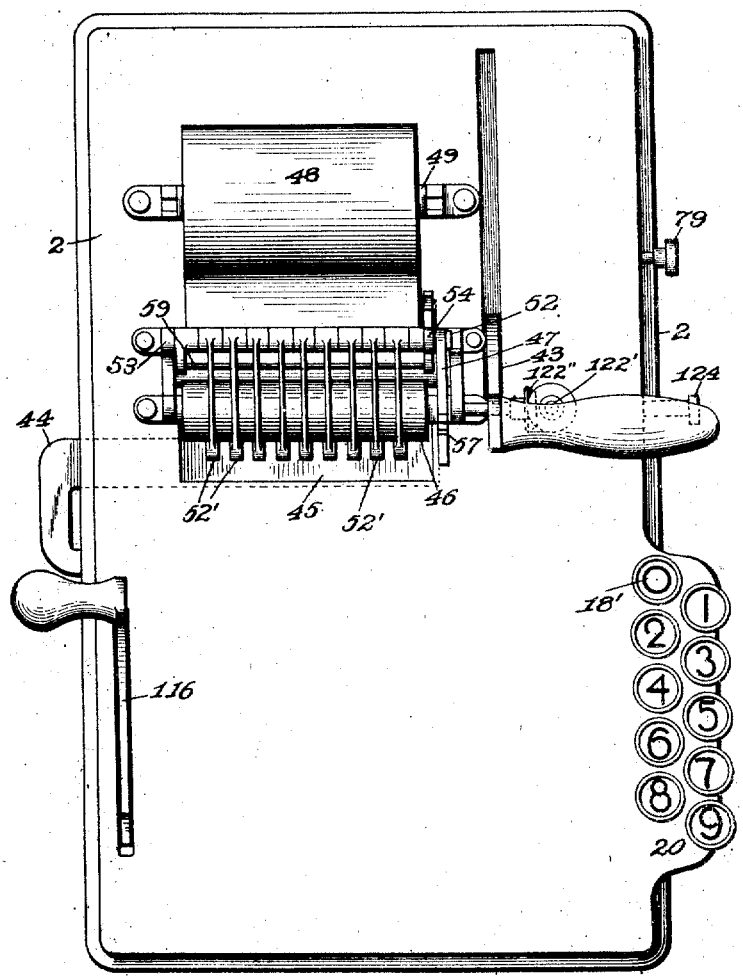

Figure 1 is a vertical longitudinal section of a computing-machine embodying my invention. Fig. 2 is a transverse vertical section thereof on the line *x x* of Fig. 1. Fig. 3 is a partial plan view of the front end of the machine on the line *d d* of Fig. 2, showing the means for releasing the stops of the stop-carriage. Fig. 4 is a detail view showing the connection between the common depression-bar and the rocking shaft that controls the forward movement of the carriage. Fig. 5 is a partial transverse vertical section on the line *y y* of Fig. 1. Fig. 6 is an enlarged longitudinal and sectional detail showing means for locking up the stops of the stop-carriage in their raised position. Fig. 7 is a transverse vertical section on the line *z z* of Fig. 1. Fig. 8 is a longitudinal sectional detail showing the adding mechanism of Fig. 1 as it appears during its forward or positive operation. Fig. 9 is a plan view showing one of the type rack-bars. Fig. 10 is a detail end view of the adding-wheels and the parts employed in direct connection therewith. Fig. 11 is a vertical section thereof on the line *a a* of Fig. 10. Fig. 12 is a detail plan view showing the clutch mechanism for disengaging the stop-carriage from the rest of the mechanism. Fig. 13 is a partial longitudinal vertical section with the type-bars, adding-wheels, and accessory parts thereof. Fig. 14 is a longitudinal section showing the means for reversing the parts when it is desired to compute and print totals. Fig. 15 is a reduced plan view of a complete machine.

I inclose the working parts of my machine in a suitable casing 2. In the forward end of this casing I provide a movable stop-carriage 3, arranging the same preferably in the upper part thereof. The carriage 3 is a frame from the front side of which arms 4 project to sliding bearings upon a smooth frame-rod 5, while the other end of the carriage is supported by rollers 6, movable on a stationary track 7. Small arms 8 are pivoted on the side of the carriage-frame to carry the toothed ratchet-bar 9. (See Fig. 2.) This ratchet-bar is adapted to be engaged by the double-pawl device 10, similar in operation and construction to the device for releasing a typewriter carriage (see Figs. 1 and 2) on the rocking shaft 11. The shaft 11 is supported in the frame parts 12 and is arranged to be rocked back and forth through the use of the lateral arm 13, connected with the depression-bar 14. (See Figs. 2 and 4.) As shown in these figures, the depression-bar 14 has inwardly-extending arms 15, pivoted on the same shaft 16 whereon the key-levers 17 are journaled. The spindles 18 of the ten keys 18′ are adapted to move up and down through the guide-plate 20 and have their lower ends pivoted to the outer ends of their respective key-levers 17. These levers extend inwardly, and their inner ends are of the same length, measured from the shaft 16, and each has a broad flat foot or end 21, adapted to engage oppositely-positioned pins 22 in the carriage, (see Figs. 1 and 2,) and springs 22″ are provided to draw back the keys after the stops have been locked in their raised position. Irrespective of arbitrary convenience characters I employ but ten keys, bearing or representing the ten numerals "0," "1," "2," "3," "4," "5," "6," "7," "8," and "9," the use of duplicates being rendered unnecessary by the employment of the shifting carriage 3, which by means of the stops 22 therein limits the movement of the type-carrying bars 32. The stop-carriage 3 may be provided with any number of rows or series of stop-pins 22, each row containing nine pins, and the pins of each row being transversely opposite the key-levers 17 and keys "0" to "8," respectively. A "9" stop for all type-bars is provided in a fixed rib 22′ on the forward edge of the carriage; but manifestly stops may be provided for the "9's," as for the other figures or digits, if desired. (See Fig. 1.) The key-lever of the "9" key simply operates to release the carriage and allow it to move laterally one step. The stop-pins 22 extend through the top and bottom plates of the carriage 3 and are each provided with a shoulder or collar 23 near the lower end and are normally held down by light springs 24. (See Figs. 1 and 6.)

Alongside of each row of stop-pins 22 within the carriage 3 I provide a longitudinally-movable locking-bar 25, provided with a lateral pin 25′ for each stop-pin and adapted to snap back beneath the collar or shoulder on a pin when the pin is raised. The keys are operated one at a time, and the depression of a key will raise the stop-pin which happens to be over the inner end of its key-lever. At the same time that a key is depressed and immediately after the raising and locking of the stop-pin 22 the carriage 3 is released by means of the rocking dog 10 and will travel one step toward the right of the machine, bringing the next row of stop-pins over the inner ends 21 of the key-lever 17. Successive operations of the keys 18′ will therefore set up a single pin 22 in each row or series of stop-pins, as many pins being raised as there are keys depressed, except when the key 9 is struck, when the carriage is simply moved to the right. Each movement of the carriage 3 therefore represents a figure, and all the movements together represent a given number, running from thousands through hundreds, tens, units, and decimals or simply through units and decimals or through decimals only, according to the number of keys used. The numbers are then practically set up in their proper order from left to right. When the carriage is released, as described, it is drawn along by means of a spring 27, acting on the pivoted lever 26, connected to the carriage 3. At the end of a complete operation of the machine, the other portions of which will be hereinafter explained, the carriage is thrown back to the left or normal position by a rocking movement of the shaft 28, whereon the lever 26 is secured, the ratchet-teeth of the bar 9 slipping back readily over the double dog 10. When the carriage is thus thrown back, all of the stop-pins 22 are released by the engagement of the outer ends of the locking-bars 25 with the stationary returning-bar 29, fixed in the frame and having the beveled end or corner 30, the locking-bars 25 being thus forced back against the tension of their individual springs 31. (See Figs. 1, 3, and 6.)

The stop-pins 22 in the carriage are employed to limit the forward thrust of the combination type and rack bars 32, of which there are as many as there are longitudinal rows or series of stop-pins in the carriage. Each type and rack bar 32 is provided on its upper edge with a series of ten numeral-types 33, while the lower edge of the bar has gear-teeth 34, with which the adding-wheels 91 are adapted to mesh, as will be more particularly explained hereinafter. The bars 32 are freely movable in longitudinal guides, and for each bar a bell-crank lever 36 is provided, the lever being pivoted on a transverse shaft 37 in the bottom of the casing, strong springs 38 being connected therewith. Free movement of the bars and their levers is permitted by the employment of the slot-and-pin connections. (Shown in Fig. 1.) The type-bars 32 are normally held back by a cross-rod 40, arranged between opposite arms 41, secured upon the main shaft 42 of the machine. (See Figs. 8 and 13.) It is obvious that when the bell-cranks 36 are released from the cross-rod 40 the bars will be quickly moved forward until their forward ends 39 engage the pins 22, set up in the stop-carriage 3. The operating-lever 43 has its lower end secured upon the shaft 42, and when the lever is forced back the rod 40 will obviously be swung down out of the path of the bell-cranks 36, thereby permitting the rack-bars to move forward when thus released, and when a fewer number of stop-pins are set up than there are rack-bars I provide a separate lock for the bars, said lock consisting in the transver ely-movable bar or slide 44, attached to the movable bars with the stop-carriage and so arranged that the first movement of the stop-carriage will carry the slide 44 beyond and out of the way of the first type-bar, the second movement beyond the second type-bar, and so on, so that just as many type-bars will be freed as there are keys operated. The type on the bars 32 and the stop-pins 22 on the carriage 3 are so arranged that whatever pins are engaged by the type-bars the type on the said bars will be in line beneath the transverse slot 45 in the top of the casing. (See Figs. 1 and 15.) The type run "0," "1," "2," "3," &c., from the front end of each bar, while the keys and the stops to be actuated thereby are so arranged that the "0" is nearest the forward end of the type-bar, "1" next, then "2," &c. Therefore in each row the stop representing the "0" key will be nearest the forward end of the type-bar in the row of type-bars, so that in case two keys are struck at the same time the stop for a smaller key will cut out those representing larger numbers.

From the foregoing it is to be observed that the principle governing the coöperation of the stops 22 and the type-carriers 32 lies in the relative movements of the carriage carrying the said stops and the type-carriers, whereby the stops are moved into the path of travel of the type-carriers as required to limit their movement irrespective of arbitrary direction of movement. While the form herein shown contains type-carriers in the form of bars which move horizontally, yet it is clear that the same principle may be adapted to any other forms of type-carriers, whether circular, straight, arcuate, or oval, it only being necessary that the keys operate the stops and act upon the escapement or pawl device controlling the stop-carriage, so that the latter may move or be moved to bring such of the stops 22 as had been set up into a position such that they will limit the movement of a corresponding number of type-carriers, and thereby register a number. I have shown the keys located at the side of the machine and the stop-carriage moving parallel to the key-levers; but other arrangements will readily suggest themselves, and no arbitrary arrangement is necessary so long as the relative movements described result from the operation of the associated mechanism.

The swinging movement of the cross-rod 40, as shown in Figs. 1, 5, 12, and 13, may be employed to throw back the stop-carriage. As illustrated in Figs. 1, 2, 5, 7, and 12, the shaft 28, on which the lever 26 is secured, is provided with a beveled gear-wheel 70. A short shaft 71 is arranged transversely to the shaft 28 and has a bevel-gear 72, meshing with the gear 70 thereon. On the other end of the shaft 71 is an arm 73, connected by a pivotal link 74 with the lower end of a vertical lever 75. (See Figs. 1 and 12.) The upper end of this lever 75 extends into the path of the moving rod 40, so that when the rod is thrown back and up at the end of the operation of the machine the lever 75 will be forced back to rotate the two shafts 28 and 71, operate the lever 26, and move back the carriage 3. To prevent the carriage being moved literally by the downward movement of the rod 40, I construct the lever 75 in two parts, the upper part being pivoted on the lower part and adapted to break forward against the tension of a light spring 77. By this arrangement the upper end of the lever 75 may be depressed without moving the lower part, which is connected with the shaft 28. Furthermore, when it is desired to print the same number several times, in which case it is desirable to allow the stop-carriage to remain stationary, the throw-back mechanism may be disengaged by simply throwing out the clutch 78, a pull-button 79, connected with the clutch by a short lever 80, being provided for the purpose. (See Figs. 12 and 13.) As a result of the stop-carriage being thus held stationary the stops which had been set up are not restored to idle position, but remain to limit the throw of the type-carriers, which may be repeatedly released by operation of the lever 43 and operated by their springs, so that the same number will be repeated or reprinted as many times as the lever is operated, or until the clutch 78 is again set by pushing in the button 79, whereupon the stop-carriage will at the next operation of the lever 43 be moved back to normal position and the stops 22 released and restored. The total of all the numbers printed, whether repeated or not, will be accumulated by the adding-wheels, which at each operation of the type-carriers take up the number printed, as will hereinafter fully appear.

46 represents a paper-feeding roll arranged at the rear edge of the slot 45 and suitably supported in frame-bearings. The paper strip 48 is carried upon the independently-supported roll 49 and is carried between the roll 46 and the idler-roll 50 and then out and across the slot. (See Fig. 1.) An inked ribbon 48′ extends across the slot, and an advance mechanism is provided therefor.

52 represents a shaft arranged in bearings 53 and carrying as many hammers 52′ as there are type-bars 32. (See Fig. 15.) These hammers 52′ are loosely journaled on the shaft 52, and from the end of the shaft an arm 54 projects down through the casing into position to be engaged by the pin or lug 55, extending from the lever 43. This arm 54 is secured upon the shaft 52 and is acted upon by the spring 56, tending to draw the same back, and thus thrust forward the pawl 47, pivoted upon the upper end of the arm and operating on the ratchet 57, provided on the end of the paper-feeding roll 46. (See Figs. 1 and 13.) Backward movement of the roll is prevented by a spring-detent 58. A rod 59 extends between the forward part of the arm 54 and a like arm on the other end of the shaft 52 and is parallel with the shaft 52 under the hammers 52′, which are normally upheld thereby. The hammers 52′ have stop-shoulders 60 and are normally held against this rod and are actuated by light springs 61, this arrangement being employed in order that the hammers may be independent from one another to strike type, which need not be of exactly the same height. It is obvious that the hammers must be released quickly at the time when the operating-lever 43 is nearing the end of its stroke or throw and must be held at other times, and for this purpose I provide a spring-hook 63, conveniently journaled on the shaft 42 and adapted to engage an arm or lug 64, extending from the rear side of the arm 54. (See Figs. 1, 8, and 13.) The hook 63 is thrown out of engagement with the lug 64 by the pin or lug 55 on the operating-lever 43, which strikes the hook 63 when the operating-lever is moved backward. When thus released, the spring 56 snaps the arm 54 backward, and thereby removes the cross-rod 59 from the shoulders 60 of the hammers 52′, and the latter are thrown against the type by their springs 61. To raise the hammers 52′ slightly off the type after a stroke, I provide a small cushion-spring 65, on which the arm 54 rebounds. (See Fig. 1.) A suitable spring 66 is arranged around the shaft 42 for holding the hook 63 forward. (See Fig. 13.) On the return of the operating-lever 43 to the position shown in Figs. 1 and 13 all of the hammers will be raised and locked in a raised position by the engagement of the pin 55 with the lower end of the arm 54 to swing the same up, so that the lug 64 will catch beneath the shoulder on the hook 63.

By means of the mechanism thus far described a series of numbers from one to nine figures each may be printed upon the strip of paper in succession, the printing being done on the under side of the sheet, which may readily be rendered visible by simply turning back the paper.

So far the machine is complete. A machine of this class is not, however, thoroughly complete without means for adding a series of numbers and printing the total thereof, and I therefore provide an adding mechanism to operate in connection with the rack-bars 32. Within the casing I provide the two frame-standards 83, each of which is provided with a slot 84 in its upper end. (See Figs. 7 and 13.) The middle parts of the standards are connected by a stationary rod 85. On the opposite ends of the rod 85 I locate similar levers 86, provided with cam-grooves 87 in their upper ends, said grooves being adapted to receive the ends of the shaft 88 or small rollers 88′ thereon. (See Fig. 11.) The shaft preferably has square parts 89, adapted to slide in the slots 84 to prevent rotation of the shaft 88. (See Fig. 11.) The vertical movement of the shaft is brought about by the swinging of the levers 86. The cam-levers 86 are moved forward and back by means of the links 90, (see Fig. 13,) connected with the lever-arms 41 on the shaft 42, and in order to allow sufficient time for the type-bars to move forward before the adding-wheels 91, which are arranged on the shaft 88, are raised into engagement therewith short slots 92 are provided in the arms 41, with the link-pins 92′ working therein to the ends of the slots, the slots being of less length than the full throw of the operating-lever, but sufficient to permit full movement of the type-carriers prior to moving the levers 86. Thus during the last part of the movement of the lever the adding-wheels 91 are raised into mesh with their respective type-bars 32. The adding-wheels 91 are journaled and move independently on the shaft 88. As they are raised into engagement with the type-bars 32 only after the latter have completed their forward movement, the adding-wheels 91 are operated by the backward movement of the type-bars when the operating-lever 43 is drawn forward to carry the rod 40 into engagement with the bell-cranks 36, connected with the bars 32. Each adding-wheel 91 has ten teeth, just as the type-bars 32 individually have ten type 33. The carrying mechanism for moving the next wheel of a higher order one tooth for each complete rotation of the preceding wheel of a lower order is best shown in Figs. 1, 7, 8, 10, and 11. A shown therein, a lug 93 extends from the left-hand side of each adding-wheel, the lug preferably conforming to the shape of one of the teeth.

Two movable frame parts 94 are arranged upon opposite ends of the shafts 85 and 88, the upper ends of the frame parts 94 being secured upon the shaft 88, while the lower ends are vertically slidable on the shaft 85, owing to the slots 95, provided in the said ends. (See Fig. 13.) Between the middle and rear parts of the frame-pieces 94 a stationary or fixed shaft or rod 96 is secured to receive the locking pawls or detents 97, normally pressed up by springs 97′. (See Fig. 1.) The pawls 97 are arranged upon the shaft 96 and extend between the adding-wheels 91 and are provided with the upwardly-extending and inclined lugs 98, (see Fig. 1,) adapted to be struck by the lugs 93 on the adding-wheel, to the right thereof, the pawls 97 controlling the action of one wheel upon the succeeding wheel. Each intermediate mechanism is completed by a vertical lever 100, pivoted upon the stationary rod 85, and a second vertical lever 101, provided with a lateral lug 102 and pivoted upon a cross rod or shaft 103, which rod is fastened to the lower forwardly-projecting ends of the parts 94 and moves therewith, as shown in Fig. 8. Springs 104 and 105 are connected with the lower ends of the levers 100 and 101, respectively, to draw the same back and throw their upper ends forward whenever released. The upper end of each lever 100 has the form of a segment of a gear to mesh with the teeth of the overlying adding-wheel 91 when the same is dropped into its lower position. (Shown in Figs. 1 and 10.) The lug 102 on the lever 101 is adapted to lie in the notch 106 in the pawl 97, and the rear edge of the lever 101 is adapted to engage the forward edge of the lever 100, in which position the lug 102 will be seated in the notch 106 and lock both levers 100 and 101. When the pawl 97 is depressed through the engagement of the lug 93 on the preceding adding-wheel with the lug 98 upon the pawl, the lug 102 is disengaged from the shoulder on the pawl 97, whereupon the lever 101 will spring out of engagement with the lever 100, after which the pawl is held down by the lug 102. A stop 107 is preferably provided at the end of the pawl 97 to limit the movement of the lever 101. When the lever 100 is thus released, its spring 104 will throw out its upper end, and thereby rotate the adding-wheel one tooth. The throw of the lever 100 is controlled and timed by means of a swinging cross-bar 108 to engage all of the levers 100 and itself adapted to be operated by the swinging cross-rod 40. When the latter is thrown down, the lever-arms 109 of the cross-bar 108, pivoted on fixed shaft or shafts 110, will be released and be drawn up by the spring 111 to carry the cross-bar 108 up behind the levers 100. When the swinging rod 40 is restored, the cross-bar 108 will be moved beneath the projections on the back of the levers 100, thereby permitting the one which had been released from the lever 101, as above described, to be moved by the spring 104 to throw forward the upper end thereof and rotate the corresponding wheel 91, which is the process of carrying from a lower to a higher order. For restoring the two levers 100 and 101 a cross-rod 112 is provided between the lower ends of the cam-levers 86, whereby as the operating-lever 43 is thrown back to raise the adding-wheels 91 with the pawls 97 and levers 101 the bar 112 will strike the lower ends of such of the levers 101 as have been previously released and move the same back against the levers 100 and thence into their normal position, in this way restoring the levers 100 and the pawls 97, while the said levers 100 are disconnected from adding wheels 91.

The tens are carried forward in the following manner: By moving the lever 43 forward the adding-wheels will be raised into engagement with the teeth on the under side of the rack-bars after the bars have completed their forward movement. The shafts 96, 88, and 103 are moved vertically with the adding-wheels, while the shaft 85, carrying the levers 100, remains stationary, so that when the adding-wheels are raised the teeth thereon will be disengaged from the segment-gear on the upper end of the levers 100. The adding-wheels having been raised into engagement with the teeth of the rack-bars, upon moving the lever 43 forward the rod 40 will be brought into position to engage the upright levers 36, and as the lever 43 is moved still farther forward said levers 36 will be returned to their normal position, at the same time drawing the rack-bars back and rotating the adding-wheels that are in engagement with the teeth thereof.

Suppose the units-wheel to be rotated so that it stands at "9." It is evident that the next movement of the wheel will bring the lug 93 into engagement with and along the inclined surface of the lug 98, thereby depressing the pawl 97 and unlocking the lever 101, which is thereupon operated by its spring 105 so far as the stop 107 will permit. The lever 100, which is normally held by the said lever 101, will at this time be prevented from moving by the cross-bar 108 until such time as the adding-wheels have been dropped, so that the teeth of the same are in engagement with the upper end of the levers 100 and the bar 108 has been disengaged from the lever 100 by the return movement of the rod 40, and in no case does the rod 40 act upon the levers 109 to release the levers 100 until the adding-wheels have been dropped to their normal position. When the levers 109 are moved to the position shown in Fig. 1, the levers 101 having been previously unlocked, as described above, the springs 104, provided at the lower end of the levers 100, will operate the same and advance the tens adding-wheel one tooth. Should the tens-wheel stand at "9," the movement of the rack-bar will cause the lug 93 on the tens-wheel to depress the pawl 97 and unlock another lever 101 in the same manner as described with reference to the units-wheel, and the adding-wheels having been dropped back to their normal position in engagement with the levers 100 and the lever 109 being operated by the rod 40 the spring 104 will operate another lever 100 and advance the hundredths-wheel one tooth.

The totals are ascertained from the final relative locations or positions of the adding-wheels 91 or, more particularly, of the side lugs 93 thereon. These positions are ascertained by rotating all of the wheels in the opposite direction from their ordinary movement and until their lugs 93 strike the forward sides of the lugs 98 upon the pivoted pawls 97. As the pawls 97 rise with the wheels these movements are made through the rack-bars 32, the wheels being first raised into engagement therewith and the rack-bars then released. The springs 38, in connection with the rack-bars, will cause each of the same to move forward as far as the lug 93 upon its adding-wheel 91 will permit. The totals will then be shown upon the bars 32 by the type 33 beneath the slot 45 in the top of the casing 2 and may be printed therefrom.

Inasmuch as the backward movement of the rack-bars 32 is commonly employed for rotating the adding-wheels 91 and computing the numbers from the relative position of stops 22 in the stop-carriage 3 and as the opposite movement is employed when it is desired to print the totals of the wheels, it is necessary to accommodate the parts of the machine to such backward or reverse movement. This I accomplish by simply changing the pivotal connections of the cam-lever links 90 from above the centers of the operating-arms to equal distances below the same, so that a movement of the main lever 43 will result in reverse movements of the other parts.

Slots 114 are provided in the opposite operating-arms 41, communicating between the slots 92 and the lower curved slots 115, into which the pins upon the ends of the cam-lever links 90 may be thrown by means of the pivoted adding-lever or bell-crank 116, preferably arranged upon that side of the machine opposite the operating-lever 43 and journaled on the stud 116′, as shown on Fig. 14. The link 90 upon this side of the machine is provided with an extension 90′, pivotally connected to the lower end of the lever 116 by the link 90″. The lever 116 operates against a strong spring 117, having one end secured to the side of the machine and its other to the extension 90′. The opposite end of the link 90 is connected with the similar link 90 upon the other side of the machine by a rod 91′. (Shown in section in Fig. 14.)

When it is desired to add the columns of figures printed from the respective type-bars, the lever 116 is thrown to the position indicated by dotted lines in Fig. 14, thereby raising the adding-wheels 91 into engagement with the teeth 34 on the under side of the type-bars 32, and by operating the lever 43 each type-bar 32 will be allowed to move forward until the adding-wheel with which it is in engagement is stopped by its lug 93 coming in contact with the lug 98 on the adjacent pawl 97. As each adding-wheel 91 had been rotated by the backward movement of the type-bar 32 as many teeth as its type-bar had been moved forward in printing the column, it is obvious that the number of teeth on each adding-wheel 91 between the lug 93 and the lug 98 on the pawl 97 will correspond to the number of units in the column to be added, and when each adding-wheel is stopped by its lug 93 coming in contact with the lug 98 the numeral shown on each type-bar 32 beneath the slot 45 will indicate the sum of the units printed from that particular bar plus the sum of the tens carried forward from the preceding bar. Further, as none of the type-bars 32 could move forward to perform the adding operation unless the locking-slide 44 upon the carriage was removed I provide a rocker arm or arms 118 on the rod 5 at the forward end of the machine and arrange a cross-rod 119 between the ends of the rocker-arms 118, said rod being adapted to be raised by the engagement of the lever 116 with the inner end of the rocker-arm and this movement being utilized to swing or raise the ratchet-bar 9 on the carriage out of engagement with the double pawl 10 beneath it, so that the carriage may move out and carry the locking-slide 44 away from the type-bars.

A simple arrangement for slowly moving the ink-ribbon 48′ is shown in Fig. 7, wherein 120 represents spools upon which the opposite ends of the type-ribbon are turned and 120′ rolls over which the ribbon passes as the spools revolve. These spools 120 are arranged in connection with bevel-gears 120″, adapted to be engaged by bevel-pinions 121″, arranged upon a vertically-movable sleeve 121, geared to the vertical shaft 122. The shaft 122 is permanently geared by bevel-gears 122′ and 122″ to an extended end of the shaft belonging to the paper-feeding roll 46.

The direction of movement of the ribbon 48′ may be altered by shifting one or the other of the pinions on the sleeve into engagement with its spool. For shifting the sleeve I provide a push-block 123, operated by a knob 124, extending through the side of the casing 2.

Briefly, the operation of the machine is as follows: The operator strikes the keys and the carriage moves along to its proper position. By operating the lever 43 the rod 40 is moved out of the path of the levers 36, and such rack-bars as are not held in their normal position by the locking slide or bar 44 are permitted to move forward against their respective stops that are set up by the operation of the keys. During the movement of the lever 43 the hammers are released and are thrown upon the paper and cause the numerals or characters provided upon the rack-bars beneath to print thereon. When the operating-lever is drawn toward the front of the machine, the rod 40 is brought in contact with the upright levers 36, forcing them back to their normal position, together with the rack-bars which have been previously released. This movement also raises the hammers to their normal position. The adding-wheels being raised into engagement with the rack-bars will be rotated by the return movement thereof, and should they be rotated beyond the "9" point the levers 101 will be unlocked, thereby permitting the levers 100 to advance the adding-wheels one tooth when the levers are operated by the return of the rod 40. During the backward movement of the rod 40 the carriage is returned to its normal position, so that the machine is in readiness to print the total or add another number, as may be desired.

From the foregoing description it will be seen that the act of carrying the tens is included in a single operation of the machine and is not in any way controlled by any subsequent movement.

It is obvious that the number of type-bars and the number of rows of stops in the carriage may be varied and similar or other changes made in the construction of my machine without departing from the spirit of my invention, and I therefore do not confine the same to the particular construction shown and described.

Having thus described my invention, I claim as new and desire to secure by Letters Patent—

1. The combination with horizontally-movable type-carrying parts, of a transversely-movable stop-carriage, stops arranged therein in longitudinal rows, keys for raising said stops, means for moving said carriage laterally one space or row as each key is operated, and means for moving said type-carrying parts into engagement with the stops set by the keys, substantially as described.

2. The combination, in a computing-machine, of the longitudinally-movable type-carrying parts, with a transversely-movable stop-carriage, movable stop-pins arranged in said stop-carriage in longitudinal rows, a series of keys for operating the stops in said carriage, means for moving said carriage laterally one space or row simultaneously with the operation of a key, means for locking the stops operated by the keys, in their raised position, means for moving said type-carrying parts into engagement with the stops set up, means for printing from the type upon said type-carrying parts after such movement, and means for returning said type-carrying parts and said carriage, and for unlocking the stops of said carriage substantially as described.

3. The combination, in a computing-machine, of a series of longitudinally-movable type-bars carrying type, with the transversely-movable stop-carriage arranged before the ends of said type-bars, longitudinal rows of stop-pins arranged in said carriage, keys for setting up said stop-pins, means for locking said pins in their raised position, means for releasing and means for moving said carriage laterally as each key is operated, means for releasing said type-bars, means for moving the same forward into engagement with the stops set up on the stop-carriage, and means for printing from the type upon said type-bars after such movement of the bar, substantially as described.

4. The combination, in a computing-machine, of longitudinally-movable type-bars, and type arranged thereon, a stop-carriage, tracks whereon said stop-carriage is transversely movable, rows of stop-pins arranged longitudinally in said stop-carriage, keys and key-levers, said key-levers arranged to operate upon a single row of stop-pins at a time, means for moving said stop-carriage laterally one space or row as each key is operated, means for locking the stop-pins operated by the key-levers, in their raised position, means for liberating and moving said type-bars forward into engagement with opposing stop-pins in the carriage, means for printing from the type on said bars, means for returning said type-bars and said carriage, and means for dropping said pins as the carriage is returned, substantially as described.

5. The combination, in a computing-machine, of the movable type-bars, with the movable stop-carriage, a row of stop-pins arranged in said carriage for each type-bar, permanent end stop or stops in said carriage, a single set of keys, the key-levers thereof adapted to operate on one row of stop-pins at a time, a depression-bar to be operated by said key-levers, a ratchet device interposed between said depression-bar and said carriage, and whereby said carriage is liberated to move one row laterally as each key is operated, substantially as described.

6. In a computing-machine, the combination, with longitudinally-movable type-bars and type thereon, of a transversely-movable stop-carriage provided with as many longitudinal rows of stop-pins as there are type-bars, key-levers arranged to act upon a single row at once, means for locking the pins when raised, means for advancing said carriage laterally one row or space each time a key is operated, means for moving said type-bars into engagement with said stops in the carriage, means for printing from the type-bars, and an adding mechanism arranged to be operated by said type-bars, substantially as described.

7. In a computing-machine the combination with longitudinally-movable type-bars and type thereon, of a transversely-movable stop-carriage provided with as many longitudinal rows of stop-pins as there are type-bars, key-levers arranged to act upon a single row at once, means for locking the pins when raised, means for advancing said carriage laterally one row or space each time a key is operated, means for moving said type-bars into engagement with stops in the carriage, means for printing from the type-bars, and adding mechanism arranged to be operated by said type-bars, and means whereby the totals of the columns printed from said type-bars may be ascertained, substantially as specified.

8. The combination, in a computing-machine, of movable type-carrying bars, with adjustable stops to limit the throw of said type-bars, an adding mechanism to be operated by said bars to add the subtotals determined by several movements thereof, and means in connection with said adding mechanism to limit the movement of said bars to indicate the grand total thereon, substantially as described.

9. The combination, in a computing-machine, of the longitudinally-movable type-bars, with the transversely-movable stop-carriage, the track whereon the said carriage is adapted to travel, the rows of stop-pins arranged in said carriage, there being as many rows as type-bars, the single set of keys, the levers of said keys arranged in a row to operate upon one row of stop-pins at a time as the carriage is moved across them, the spring locking-bars for said stop-pins to hold the same in raised positions, means connected with said type-bars to move the same forward independently of one another when liberated, the returning-bar 29, and means for moving said carriage and returning-bar 29 to engage the locking-bar of the stop-pins to release said pins when the carriage is returned, substantially as described.

10. The combination, in a computing-machine, of the type-bars carrying type, with the transversely-movable stop-carriage, rows of stop-pins arranged therein, the several rows being spaced to correspond with said type-bars, and the pins of the rows being spaced to correspond with the type upon the respective bars, a set of keys to operate upon a single row at a time, means for moving the stop-carriage laterally one row as each key is operated, means for moving said type-bars into engagement with opposite stop-pins, means for printing from the type on said bars, and means for returning said bars, said carriage and the stops in said carriage, substantially as described.

11. The combination, in a computing-machine, of the longitudinally-movable type-bars, with the transversely-movable carriage, the vertically-movable stop-pins arranged therein, said pins being arranged in longitudinal rows, an end stop provided upon the carriage, a set of keys equal in number to the number of stops in a single row upon said carriage, the key-levers of said keys, the ends of said key-levers being arranged in a row to act upon stops in one row at a time, upon the carriage, spring-locks for said stop-pins to hold the same out when operated by said keys, means for releasing the stop-pins when the carriage is returned, the depression-bar adapted to be operated by said key-levers, the rocking shaft to be operated by said depression-bar, the double pawl carried upon said shaft, the ratchet-bar arranged upon said carriage to engage said double pawl, a spring acting to draw the stop-carriage laterally, means for releasing, and means for moving forward said type-bars, and means for returning said bars and for returning said carriage, substantially as described.

12. The combination, in a computing-machine, of the type-bars, guides wherein the same are longitudinally movable, the transversely-movable stop-carriage, the track whereon said carriage operates, the rows of stop-pins arranged in said carriage, springs for normally holding said pins down, the collars upon said pins, the locking-bars 25 arranged between the rows of stop-pins and having lugs extending between the stop-pins, springs acting on said locking-bars to draw the same back beneath the collars upon the pins when the pins are raised, the keys and levers for operating said stop-pins, and means for moving said type-bars forward into engagement with the stop-pins which are raised in the various rows, substantially as described.

13. The combination, in a computing-machine, of the type-bars with the guides wherein the same are longitudinally movable, the stop-pins arranged in rows and adapted to be raised opposite the ends of said type-bars to limit the forward movement thereof, the levers 36 connected to the said type-bars, the springs acting thereon to move said levers and bars forward, the operating-lever 43, the cross-rod 40 carried thereby to engage said levers 36 to move and lock said levers and type-bars, substantially as described.

14. In a computing-machine, the combination, with the longitudinally-movable type-bars, of the transversely-movable carriage, rows of stops arranged in said carriage, the stops in said rows being equal in number to the number of type upon said type-bars, and equally spaced, the keys for raising the stops in said carriage, means for moving said carriage step by step as the stops are raised thereon, the levers 36 connected to said type-bars, springs acting on said levers to move the same forward, the swinging cross-rod 40, means for moving the same, said rod being adapted to engage and force back said levers 36 and thereby the type-bars, the pivoted lever 26 connected with said carriage, the rocking shaft whereon said lever is secured, the spring acting to draw said carriage toward the left hand, the lever having its end projecting into the path of said cross-rod 40, said lever connected with and adapted to break forward when the rod is moved to return the levers 36, whereby lateral movement of the carriage is avoided, substantially as described.

15. In a computing-machine, the combination, with the longitudinally-movable type-bars, of the transversely-movable carriage, rows of stop-pins arranged in said carriage, the stops in said rows being equal in number to the type upon said type-bars, and equally spaced, the keys for raising the stops in said carriage, means for moving said carriage step by step as the stops are raised therein, the levers 36 connected to said type-bars, springs acting on said levers to move the same forward, the swinging cross-rod 40, means for moving the same, said rod being adapted to engage and force back said levers 36 and thereby the type-bars, the pivoted lever 26 connected with said carriage, the rocking shaft 28 whereon said lever is secured, the spring acting to draw said carriage toward the left hand, the lever having its end projecting into the path of said cross-rod 40, said lever connected with and adapted to rock said shaft 28 to return said carriage, and said lever adapted to break forward when the rod is moved to return the levers 36, whereby lateral movement of the carriage is avoided, a clutch connection being interposed between said levers and said rocking shaft, whereby said parts may be disconnected to permit the carriage to run in its outer or normal position at the right, substantially as described.

16. The combination, in a computing-machine, of a series of longitudinally-movable type-bars and type carried thereon, with adjustable stops for limiting the movement of said type-bars, means for moving said type-bars forward and back, said type-bars provided also with racks, a shaft 88, a series of gear-wheels independently arranged on said shaft 88, and adapted to be moved into engagement with the racks upon said type-bars respectively, means for moving said wheels into and out of engagement with said racks, and means in connection with said wheels for rotating the succeeding wheels one space for each complete rotation of each preceding wheel, substantially as described.

17. In a computing-machine, the combination of the series of type-carrying rack-bars, with guides wherein said rack-bars are movable, means for moving said bars forward independently of one another, key-operated steps for limiting the forward movement of said bars to determine the position of the type thereon representing the keys struck, an operating-lever, a vertically-movable horizontal shaft, gear-wheels independently mounted thereon, cams provided in connection with said operating-lever for raising said shaft to move said gear-wheels into mesh with respective rack-bars, each of said gear-wheels being provided with a lug, carrying mechanism interposed between said wheels and adapted to be operated by the lugs thereon, means for returning said bars, said cams adapted to be operated to drop said gear-wheels after the return of the rack-bars, and fixed stops to limit the backward movement of the lugs upon said wheels whereby the totals may be obtained by moving the type-bars forward while in engagement with said wheels, and until said lugs engage said stops, substantially as described.

18. The combination, in a computing-machine, of the type-carrying rack-bars, means for moving the same forward, and a lever for returning the bars, key-operated stops to limit the forward throw of said bars, a series of gear-wheels adapted to mesh with said rack-bars, respectively, means for raising said gear-wheels into engagement with said rack-bars after the forward movement thereof, to be rotated by the return movement thereof, the stationarily-pivoted segment-levers to engage said gear-wheels respectively, when the same are lowered, springs acting upon the segment-levers, a locking device to engage said segment-levers, pivoted pawls 97 arranged between the gear-wheels and having lugs 98, lugs carried upon said gear-wheels to engage the lugs 98 and force down said pawls, spring locking-levers to be engaged by said pawls, said pawls and said locking-levers being adapted to move vertically with said gear-wheels and with respect to said segment-levers, means for releasing said segment-levers and means for returning said locking-levers and thereby said pawls 97, substantially as described.

19. In a computing-machine, the combination, with the longitudinally-movable type-carrying rack-bars, of key-adjusted stops to limit the movement of said bars, means for thrusting said bars forward into engagement with said stops, gear-wheels to be raised into engagement with said rack-bars, after such movement thereof, said gear-wheels being independent in their movement and provided with lugs 93, spring-pawls 97 to be engaged by the lugs upon said gear-wheels respectively, stationarily-pivoted segment-levers to engage the gear-wheels when lowered, the locking-levers 101 to engage said segment-levers and provided with lugs 102 to engage said pawls, said locking-levers adapted to move vertically with said wheels and pawls, springs acting upon said segment and locking-levers, an operating-lever, means in connection therewith for returning said bars, a lock for said segment-levers to be operated by the return of said operating-lever, the raising and lowering cams actuated by said operating-lever to move said gear-wheels, means in connection with said cams for returning said locking-levers and said segment-levers, and means for reversing the movement of said operating-lever and said cams, whereby said wheels are raised into engagement with said bars to be operated by their forward movement until the lugs upon the wheels engage the forward sides of the lugs upon the said pawls, thereby to ascertain the total-columns to be added, substantially as described.

20. The combination, in a computing-machine, of longitudinally-movable type-bars, the key-operated stops for limiting the movement of said bars, springs for moving said bars forward, an operating-lever for returning said bars, the paper-carrying roll arranged above said bars, the hammer-shaft, the hammers arranged thereon, the arm extending from said shaft, a pin upon said operating-lever to engage said arms to raise the same and thereby the levers, the locking-pawl to engage a lug fixed upon said shaft, and adapted to be engaged by said pin to release said shaft, and permit said hammer to fall upon the type, substantially as described.

21. The combination, in a computing-machine, of the longitudinally-movable type-bars, the key-operated stops for limiting the movement of said bars, springs for moving said bars forward, an operating-lever for returning said bars, the paper-carrying roll arranged above said bars, the hammer-shaft, the hammers yieldingly arranged thereon, the arms extending from said shaft, a pin upon said operating-lever to engage said arms to raise the same and thereby the levers, a locking-pawl to engage a lug fixed upon said shaft and adapted to be engaged by said pin to release the shaft and permit said hammers to fall upon the type, substantially as described.

22. The combination, in a computing-machine, of the longitudinally-movable type-carrying bars and the paper-rolls, with key-operated stops for limiting the movement of said bars, means for moving said bars forward into engagement with said stops, means for operating the same after the forward movement of said bars, means for returning said bars, an inked ribbon extending across said bars, rolls whereon the same is wound, means in connection with said paper-rolls for rotating the ribbon-rolls, and means for reversing the direction of rotation of said ribbon-rolls, substantially as described.

23. The combination, with movable bars each provided with a series of figures from "0" to "9," means for moving them forward, "0" first passing a given point, and a movable stop-carriage, keys for setting up stops therein and moving the carriage at each movement of a key, the "0" stops being in each row of stops nearest the bars, whereby the stops for smaller numbers will cut out those representing larger numbers in case two keys are struck at the same time, substantially as described.

24. The combination with the transversely-movable carriage, of longitudinally-movable type-carrying parts, a series of keys, means for moving said carriage laterally one space or row as each key is operated, a series of adding-wheels adjacent to said type-carrying parts, means for engaging said wheels and type-carrying parts one with the other, and means for disengaging said wheels from said type-carrying parts, for the purpose set forth.

25. The combination, with the transversely-movable carriage, of longitudinally-movable type-carrying parts, a series of keys, means for moving said carriage laterally one space or row as each key is operated, a series of adding-wheels adjacent to said type-carrying parts, means for limiting the movement of said parts at the time said carriage is moved, means for engaging said wheels and type-carrying parts one with the other, and means for disengaging said wheels and type-carrying parts for the purpose set forth.

26. The combination, in a computing-machine, with movable type-carriers, of a movable stop-carriage, stops arranged therein, keys for moving the stops, devices for moving the carriage whenever a key is operated, and devices for moving the type-carriers into engagement with the stops moved by the keys, substantially as specified.

27. The combination, in a computing-machine, of movable type-carriers, a carriage, stops within the carriage, keys for moving the stops, devices for moving the carriage transversely relative to the movement of the type-carriers, and devices for moving the type-carriers into engagement with the stops moved by the keys, substantially as specified.

28. The combination, in a computing-machine, of type-carriers, a carriage, stops within the carriage, keys for setting up the stops, and devices independent of each other for moving the stop-carriage and the type-carriers, relatively, so that one type-carrier will engage against each stop which has been set up as required to register a number, substantially as set forth.

29. The combination, in a computing-machine, of type-carriers, a carriage, stops within the carriage, keys for setting up the stops, devices independent of each other for moving the stop-carriage and type-carriers, relatively, so that one type-carrier will engage against each stop which had been set up as required to register a number, and means for holding stationary those type-carriers not required to be used in any number registered, substantially as set forth.

30. The combination, in a computing-machine, of type-carriers, a carriage and stops therein, and independent devices for moving the type-carriers and the carriage and thereby the stops, relatively, to such positions that the type-carriers which move will strike against prepositioned stops in the carriage for the purpose set forth, substantially as specified.

31. The combination, in a computing-machine, of the type-carriers, stops adapted to be moved to limit movement of the type-carriers, devices for moving the type-carriers against prepositioned stops, and totalizing devices operable directly by the type-carriers, substantially as set forth.

32. The combination, in a computing-machine, of type-carriers and devices for moving them with a carriage, stops therein adapted to be prepositioned to limit the throw of any specific type-carriers, and devices for moving the carriage and stops into such position that the type-carriers will engage the prepositioned stops, substantially as specified.

33. In a computing-machine, type-carriers and devices for operating them, said type-carriers carrying gear-teeth, in combination with adding-wheels normally out of mesh with the gear-teeth on the type-carriers, means for causing the adding-wheels to mesh with the gear-teeth aforesaid and be operated thereby, and key-operated devices for limiting the movement of the type-carriers, substantially as specified.

34. In a computing-machine, type-carriers, and adding-wheels, operable thereby, means for causing the adding-wheels to be operated by the type-carriers, carrying devices for said adding-wheels, an operating-lever, and means controlled by the operating-lever for detaining the carrying devices until the proper time to carry, substantially as specified.

35. In a computing-machine, type-carriers, adding-wheels, operable thereby, carrying devices for the adding-wheels, said carrying devices being independent of the type-carriers, stops arranged in series, keys, and each key being operable to set up a corresponding stop in each series, independent devices for moving the type-carriers and stops relatively so that the type-carriers will engage with the prepositioned stops, and means for causing the adding-wheels to be operated by the type-carriers, substantially as specified.

36. The combination, in a computing-machine, of type-carriers, a carriage and stops therein, keys for moving the stops, and means for moving the type-carriers, and the carriage and thereby the stops relatively so that throw of the type-carriers which move will be limited by the stops which had been positioned in the carriage by the keys.

37. In a computing-machine, movable type-carriers, a movable carriage, stops carried by the carriage adapted to be prepositioned to limit the throw of any desired type-carriers, means for moving the carriage and stops into such position that the type-carriers will engage the prepositioned stops, and totalizing devices adapted for operation by the type-carriers.

38. In a computing-machine, movable type-carriers, a movable carriage, stops carried by the carriage adapted to be prepositioned to limit the throw of any desired type-carriers, means for moving the carriage and stops into such position that the type-carriers will engage the prepositioned stops, totalizing devices, means for causing the operation of said totalizing devices by the movement of said type-carriers, transfer mechanism for said totalizing devices, which is independent of the type-carriers, and means for preventing operation of said transfer mechanism except when the totalizing devices are out of operative engagement with the type-carriers.

In testimony whereof I have hereunto set my hand this 22d day of September, 1903.

HARRY H. HELMICK.

In presence of—
W. T. SMITH,
S. R. SCOTT.